July 12, 1927.  
W. J. LA TOURRETTE  
1,635,367  
LIGHT RAY FILTERING SCREEN  
Filed Aug. 30, 1926

Inventor  
Willett J. La Tourrette.  
By A. J. O'Brien  
Attorney

Patented July 12, 1927.

1,635,367

UNITED STATES PATENT OFFICE.

WILLETT J. LA TOURRETTE, OF DENVER, COLORADO.

LIGHT-RAY-FILTERING SCREEN.

Application filed August 30, 1926. Serial No. 132,493.

This invention relates to improvements in the construction of light ray filtering screens for automobiles and other vehicles.

It is the object of this invention to produce a ray filtering device of the class above described that can be conveniently placed into the proper position with respect to the line of vision; that can be moved to a position out of the line of vision when not needed and which can quickly and easily be moved into operative position.

The above and other objects that may become apparent as the description proceeds are attained by means of a construction and arrangement of parts that will now be described in detail, reference for this purpose being had to the accompanying drawing in which the preferred embodiment thereof has been illustrated and in which:

Fig. 1.

Figure 1:
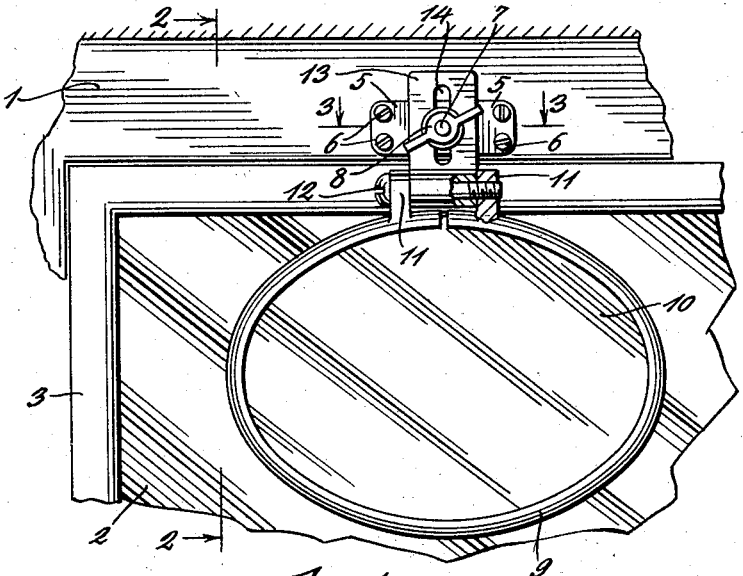
Fig. 1 is a view from the driver's seat and shows my ray filtering device in place on the car.

Numeral 1 designates that stationary part of the automobile body which surrounds the windshield 2 and against which the windshield frame 3 fits. A bracket 4 has two offset arms 5 which are perforated for the reception of screws 6 by means of which it is secured in place on the part 1. From the central portion of the bracket, a bolt 7 extends and this is threaded for the reception of the wing nut 8. An elliptical frame 9 encloses a piece of colored filter material 10 which may be glass, pyroline or some similar material. The frame 9 has two parallel ears or lugs 11 which are perforated for the reception of the bolt 12. One of these lugs is threaded for the reception of the threaded end of the bolt. An arm 13 is made from a flat piece of material of a width equal to the distance between the ears 11 and is provided with an opening for the reception of the bolt 12. The arm 13 is also provided with a slot 14 through which the bolt 7 extends. It is evident that the arm 13 may be moved with respect to the bolt as far as the slot permits and that it may be rotated about the bolt to any extent desired. After the parts have been adjusted, they are clamped in adjusted position by the nut 8.

Figures 2, 3:
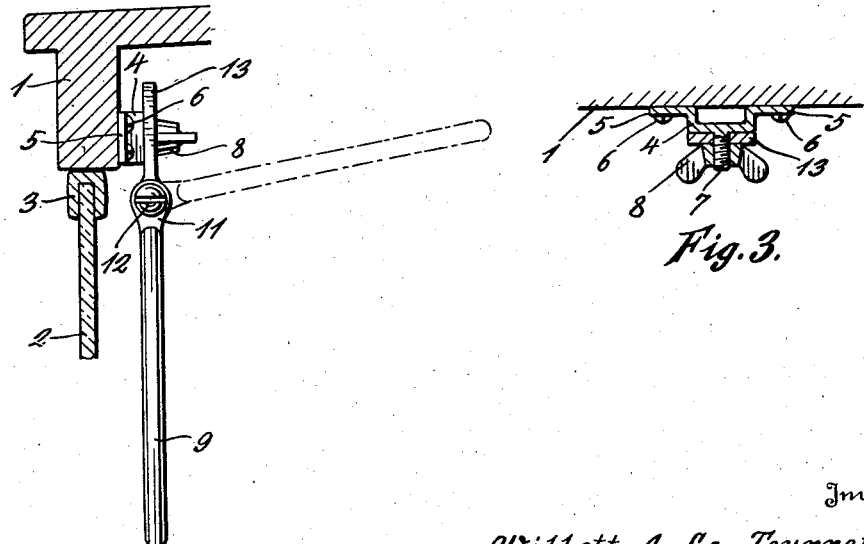
Fig. 2 is a vertical section taken on line 2—2, Fig. 1, showing a side elevation of the filtering device.
Fig. 3 is a section taken on line 3—3.

The frame 9 may be rotated about the axis of the bolt 12 from the full line position shown in Fig. 2 to the dotted line position, which latter position is the one in which it is kept while not in use. When the shield is in the dotted line position (Fig. 2) it is entirely out of the way so that it will not interfere in any way with the vision of the driver.

When the driver finds it necessary to protect himself against the glare of approaching headlights or of the sun, he merely grasps the frame and brings it down into the position shown in full lines in Fig. 2 or to any other position in which it will be interposed between his eyes and the glaring light from which he seeks protection.

By reason of the fact that the frame 9 may be rotated about the axes of bolts 7 and 12 and also moved in the direction of the slot 14 the screen may readily be adjusted to any position desired.

Having described my invention what I desire to claim as new is:

A glare shield and ray filter for use on automotive vehicles, comprising, in combination, a bracket adapted to be secured to a stationary part of the vehicle frame, said bracket having a threaded bolt projecting therefrom, a straight slotted arm secured to the bolt and clamped against the bracket by means of a wing nut whereby said arm may be rotated about said bolt or moved transversely thereof, one end of said arm having an opening lying in the plane of the arm and extending from one side thereof to the other, a frame having two spaced perforated lugs, a bolt extending through the lugs and through the opening in the arm so as to form a hinged connection between the frame and the arm and a plate of filter material secured in said frame.

In testimony whereof I affix my signature.

WILLETT J. LA TOURRETTE.